United States Patent [19]

Markussen

[11] Patent Number: 5,678,800

[45] Date of Patent: Oct. 21, 1997

[54] COMPUTER MOUSE PAD HAVING INCLINED SURFACES

[76] Inventor: Brad D. Markussen, 3394 W. 11th Avenue Dr., Broomfield, Colo. 80020

[21] Appl. No.: 541,199

[22] Filed: Oct. 16, 1995

[51] Int. Cl.⁶ .................................................. A47B 91/00
[52] U.S. Cl. .................... 248/346.01; 248/118; 248/918
[58] Field of Search .......................... 246/346.01, 118, 246/118.1, 118.2, 118.3, 918; 400/715

[56] References Cited

U.S. PATENT DOCUMENTS

| | | | |
|---|---|---|---|
| 4,313,112 | 1/1982 | Foster | 248/918 X |
| 5,195,705 | 3/1993 | Kline et al. | 248/118 X |
| 5,203,845 | 4/1993 | Moore | 248/118 |
| 5,233,881 | 8/1993 | Sayen et al. | 248/68.1 X |
| 5,326,056 | 7/1994 | Smith | 248/118 |
| 5,340,075 | 8/1994 | Schriner | 248/346.01 |
| 5,492,298 | 2/1996 | Walker | 248/918 X |

*Primary Examiner*—Ramon O. Ramirez
*Attorney, Agent, or Firm*—James R. Young; Scott B. Allison; Chrisman, Bynum & Johnson

[57] ABSTRACT

An ergonomically designed computer mouse pad for use with a hand operated computer mouse includes an inclined work surface for supporting the computer mouse. The mouse pad is symmetric so that it can be used with either the right hand or the left hand. During operation, the computer mouse is positioned on the inclined surface and the user's hand is positioned with the palm of the hand on top of the computer mouse so that the user's hand is positioned at an angle relative to the table supporting the mouse pad. The angled position of the hand creates ergonomic benefits such as reducing the muscular and skeletal strain on the user's hand and wrist. In addition, two inclined side surfaces adjacent the inclined work surface ensure that the user's hand and wrist does not rest on an abrupt edge.

40 Claims, 3 Drawing Sheets

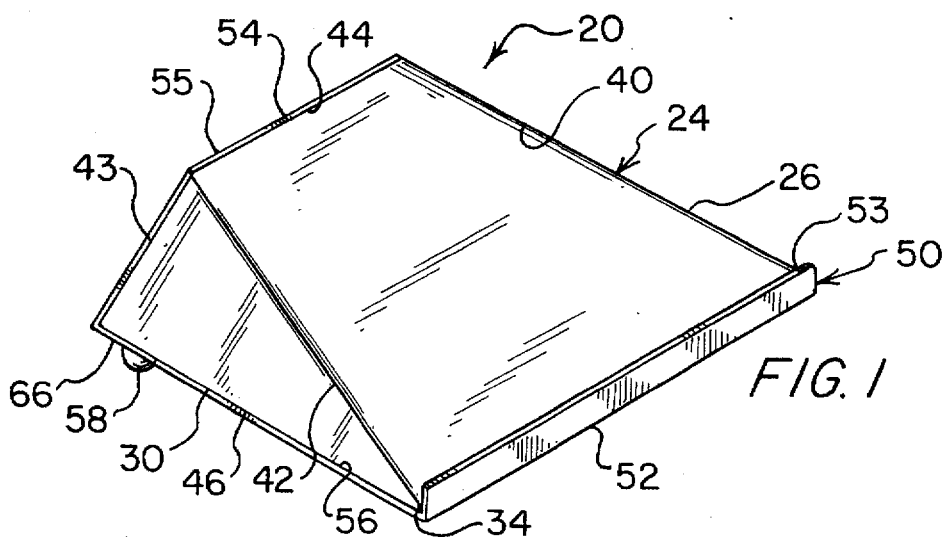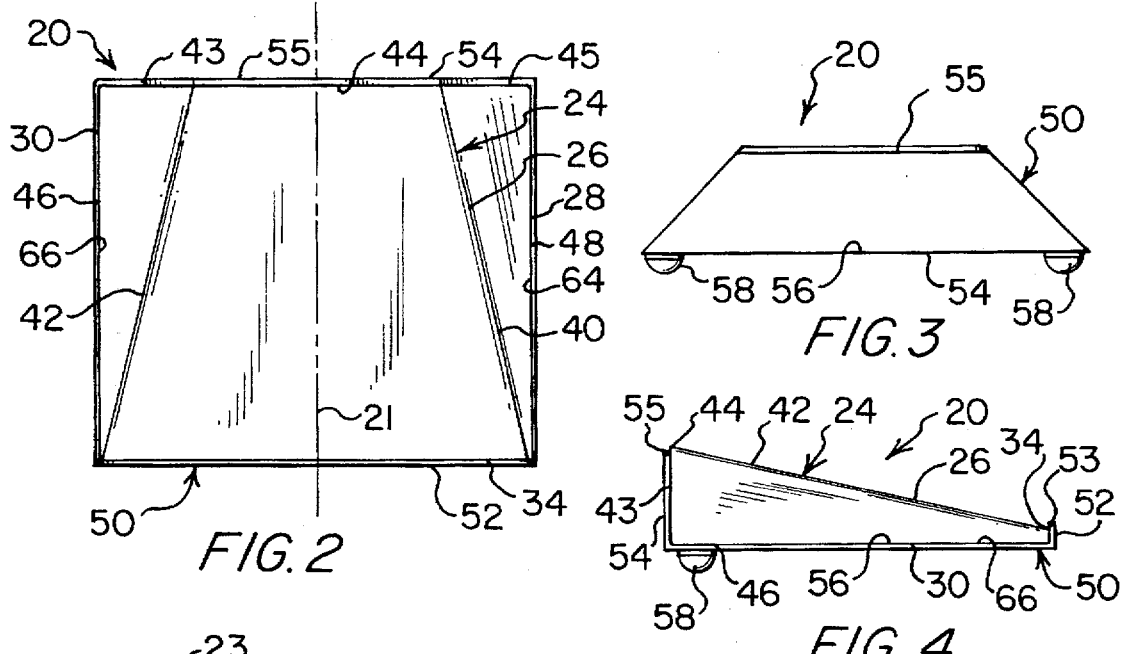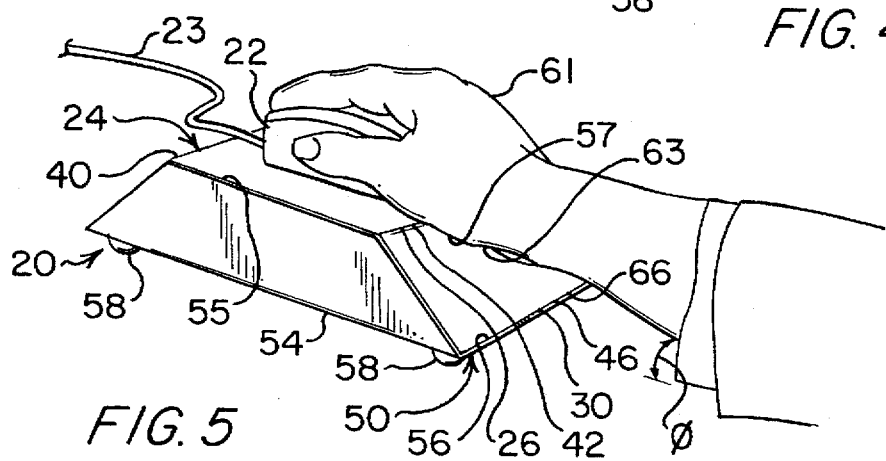

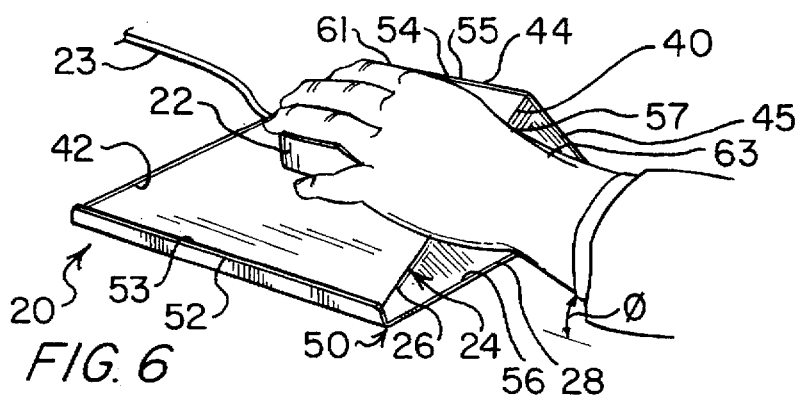
FIG. 6
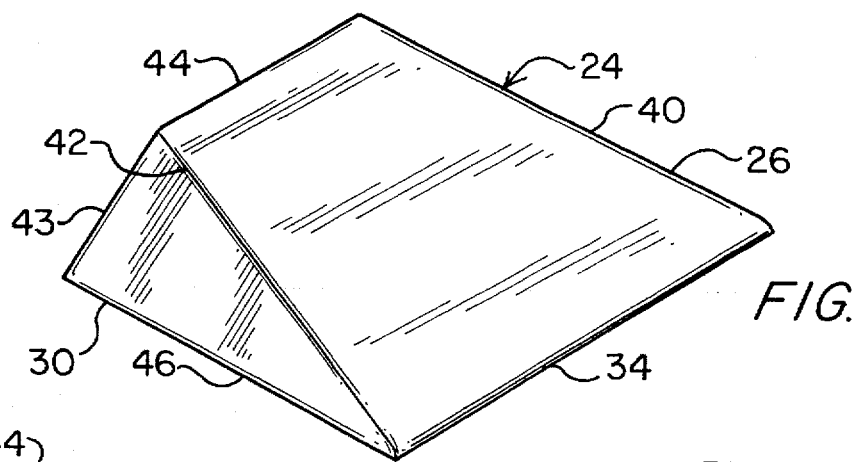
FIG. 7
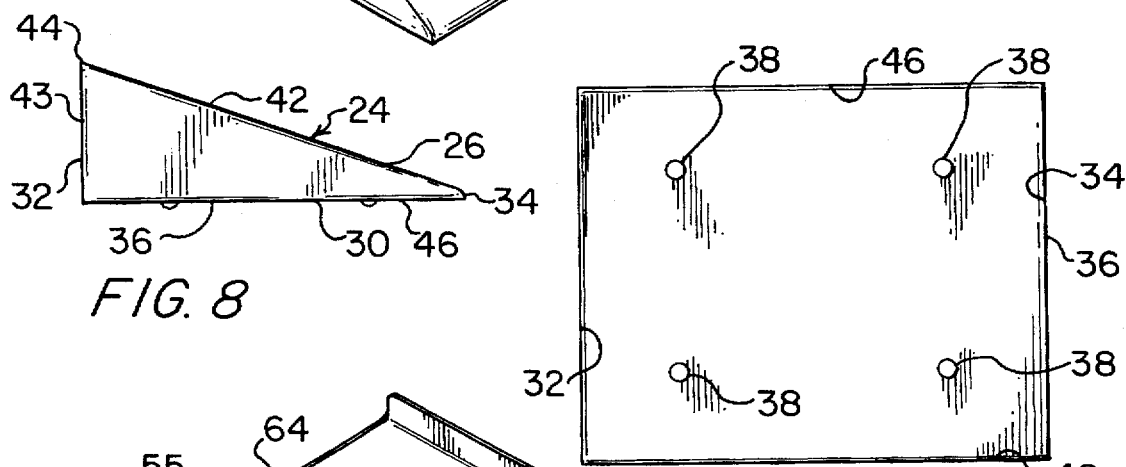
FIG. 8
FIG. 9
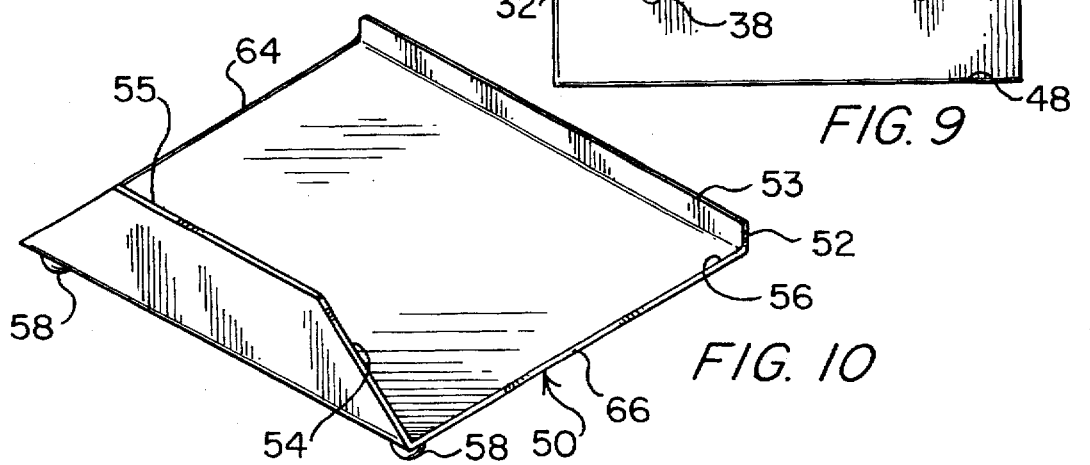
FIG. 10

COMPUTER MOUSE PAD HAVING INCLINED SURFACES

BACKGROUND OF THE INVENTION

1. Field of the Invention

The present invention is directed generally to a computer mouse pad for supporting a hand operated computer mouse. More specifically, the present invention is directed to an ergonomically designed computer mouse pad for supporting a hand operated computer mouse in a manner that positions a user's hand at any of a variety of angles relative to a surface supporting the mouse pad.

2. Description of the Prior Art

A computer mouse is a hand held and hand operated input device used in conjunction with computers to enable a computer user to point to and select or manipulate icons or items in the computer screen display without using the keyboard to control the position of a cursor or pointer located in the computer screen display. Moving the computer mouse over a supporting surface causes corresponding movement of the cursor or pointer in the computer screen display. For example, when the user moves the computer mouse forward and to the right, the cursor or pointer on the screen simultaneously moves upward and to the right in the computer screen display. Likewise, moving the computer mouse back and to the left will simultaneously move the cursor or pointer in the computer display screen downward and to the left. By using a computer mouse, the user can direct the cursor or pointer to any desired position in the computer screen display.

The typical hand held computer mouse is designed to be held and moved easily with one hand, which can be either the right hand or the left hand. In addition, the typical hand held mechanical computer mouse includes a roller ball, usually made of rubber or rubber over steel, protruding from the underside of the computer mouse. The roller ball rolls in the direction of movement as the computer mouse is moved across a surface. As the roller ball rolls, it contacts and turns two rollers rotatably mounted in the mouse at a ninety (90) degree angle to each other. The rotation of the rollers produces electric signals that cause the corresponding movement of the cursor or pointer in the computer screen display. One of the two rollers rotates in response to forward and backward movement of the computer mouse, while the other roller rotates in response to right and left movement of the computer mouse. For efficient operation, a soft, porous surface, such as latex rubber, is beneficial to ensure there is enough friction so that the roller ball rolls instead of slides over the surface as the mouse is moved. Otherwise, no electric signals will be produced in the mouse, and the cursor or pointer in the screen display will not move properly in response to movement of the mouse.

An alternative to a mechanical computer mouse is an optical computer mouse. Instead of a roller ball that rotates as the computer mouse is moved across a surface, the optical computer mouse uses a light beam to detect movement of the optical computer mouse across a specially designed pad surface. A typical optical computer mouse uses two pairs of light emitting diodes (LEDs) and photodetectors attached to its bottom, one pair of which is oriented at right angles to the other. The specially designed pad surface typically has an overlapped grid pattern so that each pair of LEDs and photodetectors detects motion in either direction across one axis of the grid as the optical computer mouse is moved.

A computer mouse is usually used in conjunction with a computer mouse pad that is positioned on a desk top or other surface on which the mouse is used in a position that is easily accessible by the computer user. The computer mouse pad can provide the desired soft, porous surface with sufficient friction to ensure the roller ball rolls in a mechanical mouse or to provide the specially designed grid pattern surface for an optical mouse. The mouse pad can also protect the desk top from scratches as well as protecting the computer mouse from contaminants which might be present on the desk top. The computer mouse pad can be made of foam rubber, rubber, nylon, or other material. For a mechanical computer mouse, so long as there is enough friction between the working surface of the computer mouse pad and the roller ball of the mechanical computer mouse to turn the roller ball when the mechanical computer mouse is moved across the mouse pad, almost any material can be used. Normal desk tops are often too smooth or glossy to create the necessary friction for rolling the ball roller, thereby necessitating use of the mouse pad. If an optical computer mouse is used, the working surface of the computer mouse pad must comprise the specially designed grid described above.

Typical computer mouse pads include a thick pad body of substantially uniform thickness with a flat top working surface upon which the computer mouse is positioned. Therefore, if the mouse pad and mouse is used on an ordinary horizontal, flat-topped table or desk, the flat top working surface of the mouse pad is also horizontal. Unfortunately, using a computer mouse oriented in such an ordinary horizontal position causes the user's hand to also be oriented substantially parallel to the horizontal table or desk top supporting the computer mouse. This position is commonly referred to as the pronated palm down position, and it can create muscular and skeletal swain on the user's hand, wrist, and arm.

Conditions such as Carpal Tunnel Syndrome, an often painful and debilitating condition, are common to computer users whose hand, wrist, and arm become tired, stiff, inflamed, and swollen due to continued use of a computer mouse that is positioned on a computer mouse pad having a flat working surface. The carpal tunnel in the wrist is an unyielding and unexpanding fiber and bone tunnel in the wrist through which flexor tendons and the median nerve extend to the hand. The flexor tendons are contracted and extended by muscles of the forearm and the hand with flex and extend the fingers. So long as the flexor tendons have room to move, they contract and extend easily. If the carpal tunnel is bent in any direction or if any of the flexor tendons became inflamed for any reason, however, the flexor tendons will not move easily and will create more friction against the carpal tunnel and the median nerve, resulting in painful inflammation and swelling within the carpal tunnel area. Furthermore, the median nerve can become compressed, pinched, or bent as a result of the inflammation and swelling, which can lead to tendinitis or other cumulative trauma disorders.

Computer mouse pads designed with some consideration of ergonomic factors are shown in: U.S. Pat. No. 5,340,075 issued to Schriner and U.S. Pat. No. 5,203,845 issued to Moore. The Schriner patent discloses a mouse pad that has a substantially planar top surface for supporting the computer mouse. Thus, the Schriner mouse pad retains many of the problems discussed above for conventional mouse pads that have flat working surfaces.

The Moore patent discloses a device for supporting a computer mouse with an inclined working surface, instead of a flat working surface. However, the working surface of the Moore device is inclined from the forward end to the rearward end, which may force the user's hand to be bent back at the wrist. Furthermore, the Moore device cannot be used interchangeably with the left hand and the right hand without mechanical alteration. In addition, the wrist rest disclosed in Moore requires the user's arm to be supported at the wrist, which can compress the median nerve in the carpel tunnel region and cause discomfort and inflammation due to continued rubbing and compression of the wrist against the support. Finally, the inclined surfaces in the Moore device make it easy for a computer mouse to roll off the side of the mouse pad when the user releases his or her grip from of the computer mouse.

SUMMARY OF THE INVENTION

It is a general object of this invention to provide an ergonomically designed computer mouse pad that reduces or eliminates medical conditions associated with repetitive use of the mouse pad.

It is another general object of the present invention to provide an ergonometrically designed computer mouse pad that is durable, simple in structure, and inexpensive to manufacture.

It is another general object of the present invention to provide an ergonometrically designed computer mouse pad that can be used by both a right handed person and a left handed person.

It is another general object of the present invention to provide an ergonometrically designed computer mouse pad that can be used by people having arms and wrists of varying sizes.

It is another general object of the present invention to provide an ergonometrically designed computer mouse pad that has the ability to keep a computer mouse from rolling or sliding off of the computer mouse pad when the user releases his or her grip from the computer mouse.

It is another general object of the present invention to provide an ergonometrically designed computer mouse pad that includes a surface on which the user can position or rest his or her arm or wrist comfortably and that does not deform the user's carpal tunnel or stress nerves, muscles, or tendons while the computer mouse pad is being used.

It is another general object of the present invention to provide a computer mouse pad that is adaptable for use with either a mechanical computer mouse or an optical computer mouse.

Additional objects, advantages, and novel features of the invention shall be set forth in part in the description that follows, and in part will become apparent to those skilled in the art upon examination of the following or may be learned by the practice of the invention. The objects and the advantages may be realized and attained by means of the instrumentalities and in combinations particularly pointed out in the appended claims.

To achieve the foregoing and other objects and in accordance with the purposes of the present invention, as embodied and broadly described therein, the mouse pad of this invention has a square or rectangular bottom surface that extends to and supports an inclined pad. The inclined pad is preferably symmetrical about a longitudinal axis with a trapezoidal top surface that is inclined upward from front to back with two triangular side surfaces that are inclined inward from the edge of the inclined pad to where the side surfaces form edges with the top surface and upward from the edge of the inclined pad to where the side surfaces form edges with the top surface. The inclined pad can be nested in an optional frame where the frame includes a front surface that extends higher than the front surface of the inclined pad so as to keep a computer mouse from rolling or sliding off the front of the computer mouse pad.

BRIEF DESCRIPTION OF THE DRAWINGS

The accompanying drawings, which are incorporated in and form a part of the specifications, illustrate the preferred embodiments of the present invention, and together with the descriptions serve to explain the principles of the invention. In the Drawings:

FIG. 1 shows an isometric view of the computer mouse pad of the present invention including an inclined pad nested within an optical frame;

FIG. 2 shows a top plan view of the computer mouse pad and frame of FIG. 1;

FIG. 3 shows a rear elevation view of the computer mouse pad and frame of FIG. 1;

FIG. 4 shows a side elevation view of the computer mouse pad and frame of FIG. 1;

FIG. 5 shows an isometric view of the computer mouse pad of FIG. 1 with the computer mouse pad being used in conjunction with a computer mouse with a person's right hand;

FIG. 6 shows an isometric view of the computer mouse pad of 1 with the computer mouse pad being used in conjunction with a computer mouse with a person's left hand;

FIG. 7 shows an isometric view of the inclined pad of the computer mouse pad of FIG. 1;

FIG. 8 shows a side elevation view of the inclined pad of the computer mouse pad of FIG. 1;

FIG. 9 shows a bottom plan view of the inclined pad of the computer mouse pad of FIG. 1;

FIG. 10 shows an isometric view of the frame for the computer mouse pad of FIG. 1;

DETAILED DESCRIPTION OF THE PREFERRED EMBODIMENTS

Figure 11:
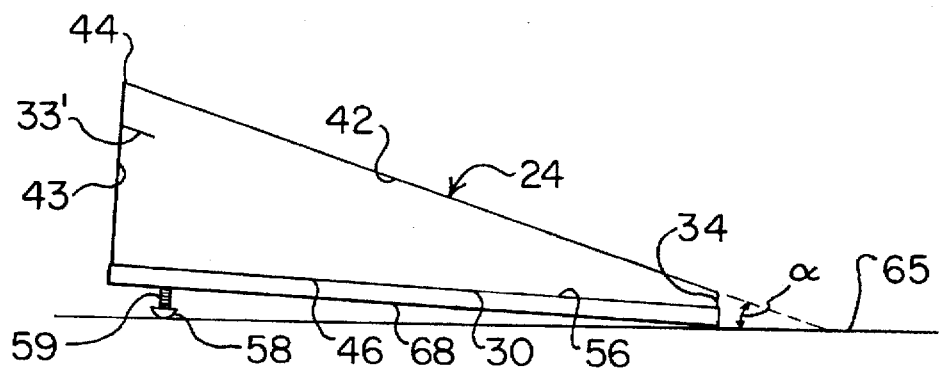
FIG. 11 shows a side elevation view of the computer mouse pad of FIG. 1, wherein the frame support feet are extended to increase the incline angle of the top surface of the inclined pad.

The computer mouse pad assembly 20 of the present invention is shown in FIGS. 1–4 and is illustrated in use with a computer mouse 22 and mouse cord 23 in FIG. 5. The assembly 20 preferably includes an inclined pad 24 (shown separate from assembly 20 in FIG. 7) for supporting the computer mouse 22 and an optional rigid frame 50 (see FIG. 10). The inclined pad 24 includes an inclined top surface 26 for supporting the mouse 22 and two inclined side surfaces 28, 30. During operation, as best seen in FIG. 5, a user places a computer mouse 22 on the top surface 26 of the inclined pad 24, which provides the working surface for the computer mouse 22. Since the computer mouse pad assembly 20 is symmetrical about a longitudinal axis 21, as illustrated in FIG. 2, the computer mouse pad assembly 20 can be used by either a right-handed person (see FIG. 5) or a left-handed person (see FIG. 6).

Referring now to FIG. 1, the inclined pad 24 of computer mouse pad assembly 20 is shown nested within and supported by the optional rigid frame 50, which will be described in more detail below with reference to FIG. 10. Preferably, the inclined top surface 26 has a trapezoidal shape with a shorter top edge 44 than bottom edge 34, and the side surfaces 28, 30 have right triangular shapes. A right triangle is a triangle that has a ninety (90) degree angle. The top surface 26 can have other shapes, however, and can be, for example, square, rectangular, or triangular. Likewise, the side surfaces 28, 30 can have other shapes and can also be, for example, square, rectangular, or triangular, depending on the shape of the top surface 26. The top surface 26 forms an angle α with the table or desktop 65 supporting the computer mouse pad, as shown in FIG. 11. The angle α is preferably in a range between about ten degrees and about twenty degrees and, optimally, the angle α is approximately fifteen degrees.

Figure 12:
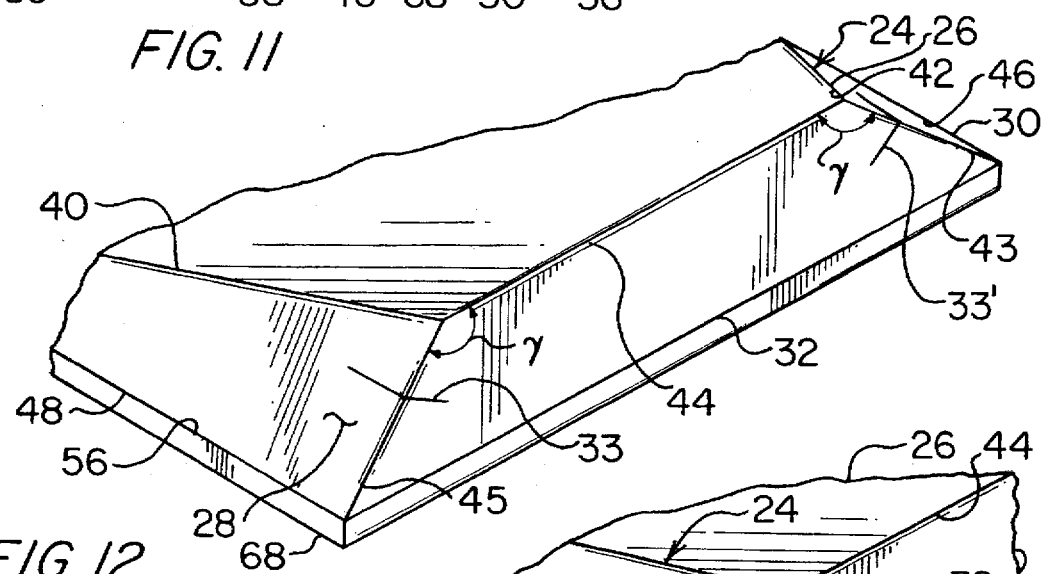
FIG. 12 shows an isometric view of a portion of the computer mouse pad of FIG. 1, wherein the optional mouse cord holder is shown in a closed position.

The side surface 28 forms an edge 40 with the inclined top surface 26. Likewise, the side surface 30 forms an edge 42 with the top surface 26. An angle γ is formed between the edge 43 of the side surface 30 and the rear edge 44 (as shown in FIG. 12). The angle γ is also formed between the edge 45 of the side surface 28 and the rear edge 44. The angle γ is preferably in a range between about 130 degrees and about 165 degrees and, optimally, the angle γ is approximately 135 degrees, in order to prevent the corners formed at the edges 40, 42 between the top surface 26 and the side surfaces 28, 30, respectively, from being too sharp or the computer mouse pad assembly 20 from being too big. The inclined pad 24 may comprise three planar sections, one of which contains the top surface 26, one of which contains the side surface 28, and one of which contains the side surface 30. Alternatively, the inclined pad 24 may also include a bottom surface 36 that further includes optional pad support feet 38, as shown in FIG. 9. The pad support feet 38 preferably comprise a non-skid material so that the inclined pad 26 does slip on the table or desk top 65 when being used without the frame 50. The bottom surface 36 has essentially a square or rectangular shape, depending on the dimensions of the inclined pad 24. The inclined pad 24 is left/right symmetric (see FIG. 2) about the longitudinal axis 21 that extends through the front edge 34 and the back surface 32 midway between the lateral side surfaces 28, 30, respectively. The inclined pad 24 can be made of foam rubber, rubber, plastic, vinyl, nylon, metal, wood, or any other material that can provide the structure described, and can be manufactured as a single piece or as component pieces that assemble together.

Referring now primarily to FIGS. 1, 4, and 6, the front section or retainer wall 52 of the frame 50 extends upward from bottom section or platform 56 so that the top edge 53 of the retainer wall 52 is higher than the front edge 34 and adjacent portion of the top surface 26 of the inclined pad 24. This extended retainer wall 52 prevents the computer mouse 22 from rolling or sliding off the front edge 34 of the inclined pad 24 and thereby retains the computer mouse 22 on the computer mouse pad assembly 20.

The side surfaces 28, 30 of the inclined pad 24 provide an area for the computer user to position and rest his or her arm or hand 61 comfortably, as shown in FIGS. 5 and 6. It is important to note that the palm 57 of the user's hand 61 can be supported by the inclined surfaces 28, 30 and the edges 40, 42 in a natural and relaxed orientation with respect to the forearm (as shown in FIGS. 5 and 6) to prevent the user's wrist 63 from being flexed or compressed, thereby reducing strain on the user's flexor tendons, median nerve, and carpal tunnel (not shown).

Figure 13:
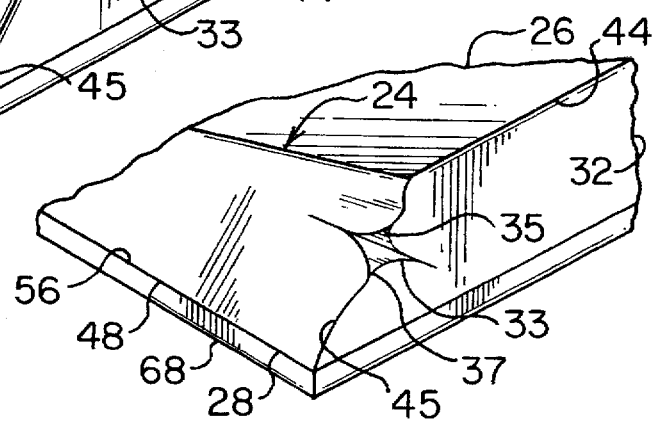
FIG. 13 shows an isometric view of a portion of the computer mouse pad of FIG. 1, wherein the optional mouse cord holder is shown in an open position.
Figure 14:
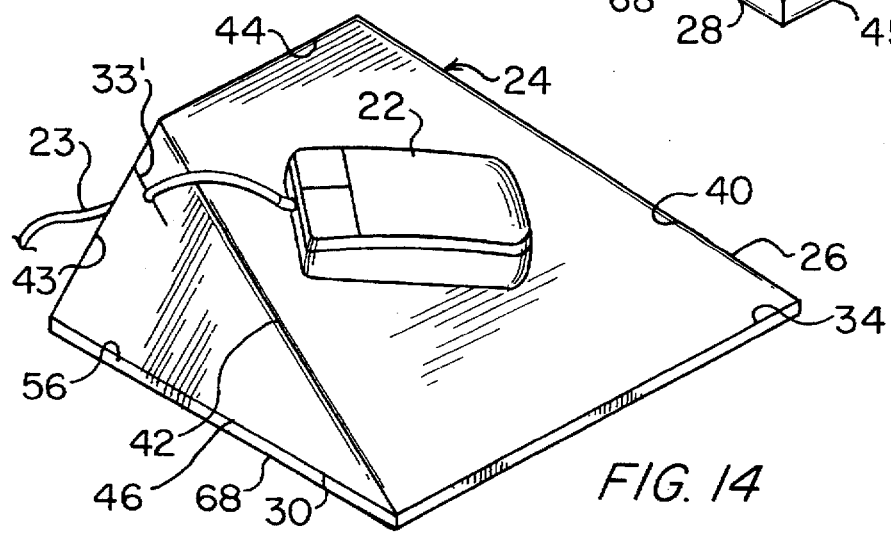
FIG. 14 shows an isometric view of the computer mouse pad of FIG. 1, wherein the optional mouse cord holder is shown securing a mouse cord.

Now referring to FIGS. 11–14, a second embodiment of the inclined pad 24 can include the optional rear surface 32 and the optional flexible and resilient mouse cord notches 33, 33'. Including the optional flexible mouse cord notch 33 is facilitated by the computer mouse pad 24 having a solid form instead of comprising only the three planar sections containing the top surface 26 and the side surfaces 28, 30, as was described above. The mouse cord notch 33 comprises a small cut, incision, or other slot extending between the side surface 28 and back surface 32 in the computer mouse pad 24. Likewise, the mouse cord notch 33' comprises a small cut, incision, or other slot extending between the side surface 30 and the back surface 32 in the computer mouse pad 24. Since the flexible mouse cord notches 33, 33' serve the same function and are structurally equivalent, other than the side of the mouse pad 24 on which they are positioned, only the flexible mouse cord notch 33 will be discussed in further detail. As shown in FIG. 13, the two notch lips 35, 37 of the flexible mouse cord notch 33 are resiliently deformable so they can be separated so that mouse cord 23 can be inserted and secured within the flexible mouse cord notch 33, as shown in FIG. 14. The inclined pad 24 is made preferably of a flexible yet resilient material with a shape-holding bias or memory, such as, for example, foam rubber, so that the notch lips 35, 37 will close (FIGS. 12, 14) when the notch lips 35, 37 are not held open. This resilience allows the user to place the mouse cord 23 in the flexible mouse cord notch 33 so as to keep the mouse cord 23 out of the way during use of the computer mouse pad assembly 20. The user can readjust the mouse cord 23 in the flexible mouse cord notch 33 as needed during use of the computer mouse pad assembly 20.

For a mechanical computer mouse, the computer mouse pad assembly 20 works best if the top surface 26 of the inclined pad 24 comprises a non-skid material, for example, vinyl or polyvinyl chloride, to provide enough friction to cause the roller ball (not shown) protruding from the underside of the mechanical computer mouse 22 to turn in the direction of movement as the mechanical computer mouse 22 is moved back and forth across the top surface 26, and so that the computer mouse 20 will not roll or slide easily down the top surface 26 toward the front edge 34 of the inclined pad 24 when the user releases his or her grip and removes his or her hand 61 from the computer mouse 22.

If an optical computer mouse is used instead of a mechanical computer mouse, the computer mouse pad assembly 20 preferably has a top surface 26 that comprises an optical grid (not shown) normally associated with an optical computer mouse and well known to people having ordinary skill in the art. Alternatively, since it is desirable to have a computer mouse pad assembly 20 that can be used with either a mechanical computer mouse or an optical computer mouse, the grid surface (not shown) required for use with an optical computer mouse can have a trapezoidal shape that corresponds to the shape of the top surface 26 of the computer mouse pad assembly 20. The trapezoidal grid (not shown) can then be positioned on top of the top surface 26 of the computer mouse pad assembly 20 when it is needed for use in conjunction with an optical computer mouse. The retainer wall 52 of the frame 50 will keep the trapezoidal grid (not shown) from sliding off the front edge 34 of the computer mouse pad assembly 20. The top surface 26 of the computer mouse pad assembly 20 can then comprise a material suitable for use with a mechanical computer mouse so that a mechanical computer mouse can be used when the trapezoidal grid (not shown) is removed from the computer mouse pad assembly 20. In addition, the friction crated between the trapezoidal grid (not shown) and the top surface 26 when the trapezoidal grid (not shown) is placed on the top surface 26 will keep the trapezoidal grid (not shown) from sliding off either of top surface edges 40, 42 or the front edge 34 of the computer mouse pad assembly 20.

Referring now to FIGS. 1, 4, and 10, the optional frame 50 includes front retainer wall 52, rear panel 54, and bottom platform 56. The frame 50 can be made of wood, metal, plastic, rubber, fiberglass, or other suitable material. The front retainer wall 52 and the rear panel 54 are substantially parallel to each other and substantially perpendicular to bottom platform 56. As shown in FIGS. 1, 4, and 6, and as discussed above, the top edge 53 of front retainer wall 52 extends upward from bottom platform 56 so that the top edge 53 extends higher than the front edge 34 of the inclined pad 24.

In a manner similar to the trapezoidal grid described above, a calculator (not shown), adding machine (not shown), keypad (not shown), trackball (not shown), or other device (not shown) can be used in conjunction with the computer mouse pad assembly 20. For example, a calculator (not shown) can be placed on the top surface 26 of the computer mouse pad 24 so that the user maintains the beneficial hand position discussed during use of the calculator (not shown). The front retainer wall 52 of the frame 50 will keep the calculator (not shown) from sliding off the front edge 34 of the computer mouse pad 24. Furthermore, the friction created between the calculator (not shown) and the top surface 26 of the computer mouse pad 24 when the calculator (not shown) is placed on the top surface 26 of the computer mouse pad 24 will keep the calculator (not shown) from sliding off either the top surface edges 40, 42, or the front edge 34 of the computer mouse pad assembly 20.

Referring now to FIGS. 1, 3, 5, and 10, the rear panel 54 of the frame 50 has a peripheral shape that conforms generally with the shape of the rearward portion of the inclined pad 24. As shown in FIG. 4, the rear panel 54 extends upwardly from the bottom platform 56 so that top edge 55 of rear panel 54 is approximately the same height above the table top or desk top 65 as the rear edge 44 of the top surface 26 of the inclined pad 24. The rear panel 54 provides support to the inclined pad 24, particularly the area of the inclined pad 24 in proximity to rear edge 44. If the inclined pad 24 is made of a flexible or otherwise non-rigid material, repeated pressure against the top surface 26 of the inclined pad 24 can cause the inclined pad 24 to become deformed. By having the top edge 55 of rear panel 54 approximately equal in distance from the table or desk top 65 as is rear edge 44 of top surface 26, this problem is reduced. It is important, however, that the top edge 55 of rear panel 54 not extend above rear edge 44 of top surface 26, since this can reduce the usable area of the top surface 26 of the inclined pad 24. More specifically, if the top edge 55 of rear panel 54 extends above rear edge 44 of top surface 26, the user might not be able to position the computer mouse 22 in the desired position on the computer mouse pad assembly 20 because the rear panel 54 will then prevent hand positions and computer mouse 22 positions that cause either the hand 61 or the computer mouse 22 to extend over the top edge 55 and the rear edge 44.

The bottom platform 56 of the frame 50 has essentially a square or rectangular shape, as shown in FIGS. 2 and 10. The shape and dimensions of the bottom platform 56 of the frame 50 are such that the inclined pad 24 can be positioned or nested snugly within the frame 50, as shown in FIGS. 1, 2, 4, 5, and 6. The front retainer wall 52 and rear panel 54 keep the inclined pad 24 from becoming displaced by forward or rearward directed forces acting on the inclined pad 24. Pad support feet 38 on the bottom surface 36 of inclined pad 24 can be provided to keep the inclined pad 24 from becoming displaced by left-ward or right-ward directed forces acting on the inclined pad 24. Alternatively, or in addition, as shown in FIGS. 2 and 10, the bottom section 56 of the frame 50 can include two parallel side extensions 64, 66 that extend upward from the bottom section 56 so that the two side extensions 64, 66 extend above the side edges 48, 46 of side surfaces 28, 30 respectively. The two side extensions 64, 66 further prevent the inclined pad 24 from becoming displaced by left-ward or right-ward directed forces acting on the inclined pad 24.

Now referring to FIGS. 3, 4, 5, and 10, the rear panel 56 of the frame 50 can include support feet 58 made of rubber, plastic, or other suitable non-skid material. The support feet 58 prevent the computer mouse pad assembly 20 from sliding across the surface upon which it is placed during use. The support feet 58 can be attached directly to the frame 50 or, alternatively, the support feet 58 can each be attached to one end of support struts 59 (see FIG. 11). The support struts 59 can be threaded so they can be adjustably screwed into threaded holes (not shown) extending into the frame platform 56 and allow the support feet 58 to be adjustably positioned closer or farther away from the frame platform 56 by the user. This adjustment allows the inclination angle $\alpha$ (see FIG. 11) to be altered to the extent desired by the user. Therefore, this adjustment feature allows the user to adjust the computer mouse pad assembly 20 to an elevation or angle that is most comfortable to the user and to a position causing the least amount of muscular and skeletal strain on the user's hand 61, wrist 63, and arm.

FIGS. 11–14 also illustrate an alternative embodiment to the frame 50 discussed above. The frame 68 shown in FIGS. 11–14 does not include the front retainer wall 52, the rear panel 54, or the side extensions 64, 66 that are included in the frame 50 embodiment of FIG. 10 that was described above. In this embodiment, the inclined pad 24 includes the bottom surface 36 (see FIG. 9), and the frame 68 is fastened securely to the bottom surface 36 of the inclined pad 24 by, for example, gluing. In this embodiment, the bottom surface 36 of the inclined pad 24 does not include the support feet 38.

During operation and use of the computer mouse pad assembly 20, the user's hand 61 and the computer mouse 22 are positioned preferably on the top surface 26 as shown in FIG. 5 for a right-handed person and as shown in FIG. 6 for a left-handed person. Therefore, the computer mouse pad assembly 20 is equally usable by right-handed people and left-handed people. The user moves the computer mouse 22 forward, backward, rightward, or leftward on the top surface 26 to cause a corresponding movement of the cursor or pointer in the computer screen display (not shown). The user can position the mouse cord 23 in one of flexible mouse cord notches 33, 33' to keep the mouse cord 23 out of the way. The side surfaces 28, 30 provide a place where the user can rest or position his or her hand 61 or arm comfortably. The user's hand 61 is preferably held at an angle $\phi$ relative to the table or desk top 65 supporting the computer mouse pad assembly 20, as shown in FIGS. 5 and 6, the extent of which angle $\phi$ can be adjusted by the user from time to time to maintain comfort. This natural and more supinated hand position is a more relaxed position for the user's hand 61, wrist 63, and arm. Thus, the user will not be required to maintain a hand 61, wrist 63, or arm position that is awkward, uncomfortable, or tiring during use of the computer mouse pad assembly 20. This natural hand position reduces muscular and skeletal strain on the user's hand 61, wrist 63, and arm. Therefore, the user of the computer mouse pad assembly 20 is less likely to suffer from Carpal Tunnel Syndrome or other similar disorders.

It should be noted that the user can also position the computer mouse 22 on the inclined mouse pad assembly 20 so that the user's hand 61 is not supported by the edges 40 or 42 or by the inclined surfaces 28 or 20 and, instead, the user's hand 61 is positioned over the rear edge 44. While use of the computer mouse pad assembly 20 in this position is not generally recommended when the computer mouse pad assembly 20 is positioned normally on a flat table or desktop 65, the position provides benefits when the computer mouse pad is oriented sufficiently lower than the user's elbow and at an angle α that aligns the top surface 26 with the user's hand 61 and arm so that the user is not bending his or her hand 61 at the wrist 63 when holding onto the computer mouse 22.

In addition to the features and advantages discussed above, the computer mouse pad assembly 20 accommodates use with equal benefit by people having hands, wrists, and arms of varying sizes. More specifically, each user can rotate the computer mouse pad assembly 20 a desired amount in relation to his or her hand in order to position his or her hand 61, wrist 63, and arm higher or lower along the top surface 26 and appropriate side surface 28, 30 to maximize comfort and to minimize fatigue while still maintaining full effective use of the entire top surface 26 of the inclined pad 24 for mouse manipulation. Correct positioning of a user's hand 61, wrist 63, and arm minimizes the forward and backward bending of the hand 61 at the wrist 63 that creates discomfort, inflammation, fatigue, and injury during prolonged or repeated use. Different people may require different positions. The trapezoidal top surface 24 in combination with the triangular side surfaces 28, 30 accommodate such adjustment by rotation of the mouse pad assembly 20 in relation to the user's hand and arm, as described above. For example, a user having a large diameter arm may wish to position his or her hand 61, wrist 63, and arm closer to the rear edge 44 of top surface 26 of the inclined pad 24 rather than the front edge 34 of the top surface 26, while still maintaining effective use of the full top surface 26 for mouse 22 manipulation. A right-handed user can do so by rotating the mouse pad assembly 20 slightly clockwise, which still maintains effective palm 57 support on the side surface 30 with comfortable hand, wrist, and arm alignment as shown in FIG. 5. A left-handed user, as shown in FIG. 6, would, of course, rotate the mouse pad assembly so slightly clockwise to get the same effect. In contradistinction, a user having a smaller diameter arm may wish to position his or her hand 61, wrist 63, and arm closer to the front edge 34 of top surface 26 of the inclined pad 24 rather than the rear edge 44 of the top surface 26, while still maintaining full use of the top surface 26. A right-handed user, to accomplish such positioning, would rotate the mouse pad assembly 20 slightly counterclockwise, while a left-handed user would rotate it slightly clockwise. In addition, and as previously discussed, the user can position his or her hand 61 so that the palm 57 (see FIGS. 5 and 6) of the hand 61 is positioned along the edge 40 to prevent the user's flexor tendons, median nerve, and carpal tunnel area from being compressed. During use of the computer mouse pad assembly 20, the use can reposition his or her hand 61 or rotate the mouse pad assembly 20 as necessary to ensure that the user's palm 57 remains positioned on the edge 40 or to find the most comfortable position and relieve fatigue.

The foregoing description is considered as illustrative only of the principles of the invention. Furthermore, since numerous modifications and changes will readily occur to those skilled in the art, it is not desired to limit the invention to the exact construction and process shown as described above. Accordingly, all suitable modifications and equivalents may be resorted to falling within the scope of the invention as defined by the claims which follow.

The embodiments of the invention in which an exclusive property or privilege is claimed are defined as follows:

1. A computer mouse pad for positioning a computer mouse at an incline in relation to a support surface, comprising:

a top surface including a first edge, a second edge, a third edge, and a fourth edge, wherein said top surface increases in height above said support surface from said third edge to said fourth edge, and wherein said top surface forms a first non-perpendicular angle with said support surface;

a first side surface extending outwardly and downwardly from said first edge of said top surface toward said support surface in such a manner that said top surface forms a second non-perpendicular angle with said first side surface; and a second side surface extending outwardly and downwardly from said second edge of said top surface toward said support surface in such a manner that said top surface forms a third non-perpendicular angle with said second side surface, and wherein said third non-perpendicular angle is approximately equal to said second non-perpendicular angle.

2. The computer mouse pad of claim 1, wherein said top surface has a symmetrical shape.

3. The computer mouse pad of claim 2, wherein said top surface has a trapezoidal shape.

4. The computer mouse pad of claim 1, wherein said first side surface and said second side surface both have triangular shapes.

5. The computer mouse pad of claim 4, wherein said first side surface and said second side surface both have right triangular shapes.

6. The computer mouse pad of claim 1, wherein said first non-perpendicular angle is between ten and twenty degrees.

7. The computer mouse pad of claim 1, wherein said second non-perpendicular angle is approximately equal to fifteen degrees.

8. The computer mouse pad of claim 1, wherein said second non-perpendicular angle and said third non-perpendicular angle are both approximately equal to 135 degrees.

9. The computer mouse pad of claim 8, wherein said second non-perpendicular angle and said third non-perpendicular angle are both approximately equal to 135 degrees.

10. The computer mouse pad of claim 1, including a removable frame nestable with said first side surface, said second side surface, and said top surface.

11. The computer mouse pad of claim 10, wherein said frame includes a bottom section and a first section extending upward from said bottom section and said third edge of said top surface is parallel to said first section.

12. The computer mouse pad of claim 11, wherein said third edge of said top surface is adjacent said first section.

13. The computer mouse pad of claim 10, wherein said frame includes a bottom section and adjustable supports connected to said bottom section for adjusting said first angle.

14. The computer mouse pad of claim 1, including a third side surface connected to said first side surface, said second side surface, and said fourth edge of said top surface.

15. A computer mouse pad, comprising a solid form having a top surface, a bottom surface, a first side surface, a second side surface having a shape and size approximately equal to said first side surface, and a third side surface, wherein said top surface is connected to said bottom side surface, said first side surface, said second side surface, and said third side surface, said bottom side surface is also connected to said first side surface, said second side surface, and said third side surface, and said third side surface is also connected to said first side surface and said second side surface, further wherein said top surface and said bottom surface form a first non-perpendicular angle, said top surface and said first side surface form a second non-perpendicular angle, and said top surface and said second side surface form a third non-perpendicular angle equal to said second non-perpendicular angle.

16. The computer mouse pad of claim 15, wherein said first non-perpendicular angle is between ten and twenty degrees.

17. The computer mouse pad of claim 16, wherein said first non-perpendicular angle is approximately equal to fifteen degrees.

18. The computer mouse pad of claim 16, wherein said top surface has a trapezoidal shape.

19. The computer mouse pad of claim 15, wherein said second non-perpendicular angle and said third non-perpendicular angle are both between 130 and 165 degrees.

20. The computer mouse pad of claim 19, wherein said second non-perpendicular angle and said third non-perpendicular angle are both approximately equal to 135 degrees.

21. The computer mouse pad of claim 15, wherein said top surface has a symmetrical shape.

22. The computer mouse pad of claim 15, wherein said first side surface and said second side surface both have triangular shapes.

23. The computer mouse pad of claim 22, wherein said first side surface and said second side surface both have right triangular shapes.

24. The computer mouse pad of claim 23, wherein said first side surface and said fourth side surface form an edge having a resilient notch extending inward into said solid form.

25. The computer mouse pad of claim 24, wherein said second side surface and said fourth side surface form an edge having a resilient notch extending inward into said solid form.

26. The computer mouse pad of claim 24, wherein said notch includes two resilient lips.

27. A computer mouse pad for positioning a computer mouse at an incline in relation to a support surface, comprising:

a top surface having a first edge, a second edge, a third edge, and a fourth edge, wherein said top surface increases in height above said support surface from said third edge to said fourth edge and wherein said top surface forms a first angle with said support surface;

a first side surface extending outwardly and downwardly from said first edge of said top surface toward said support surface in such a manner that said top surface forms a second angle with said first side surface;

a second side surface extending outwardly and downwardly from said second edge of said top surface toward said support surface in such a manner that said top surface forms a third angle with said second side surface, and wherein said third angle is approximately equal to said second angle; and a frame nestable with said first side surface, said second side surface, and said top surface, wherein said frame includes a bottom section and a first section extending upwardly from said bottom section, said third edge of said top surface being parallel to said first section.

28. The computer mouse pad of claim 27, wherein said third edge of said top surface is adjacent said first section.

29. The computer mouse pad of claim 27, wherein said frame includes a bottom section and adjustable supports connected to said bottom section for adjusting said first angle.

30. The computer mouse pad of claim 27, wherein said top surface has a symmetrical shape.

31. The computer mouse pad of claim 30, wherein said top surface has a trapezoidal shape.

32. The computer mouse pad of claim 27, wherein said first side surface and said second side surface both have triangular shapes.

33. The computer mouse pad of claim 32, wherein said first side surface and said second side surface both have right triangular shapes.

34. The computer mouse pad of claim 27, wherein said first angle is between ten and twenty degrees.

35. The computer mouse pad of claim 34, wherein said first angle is approximately equal to fifteen degrees.

36. The computer mouse pad of claim 27, wherein said second angle and said third angle are both between 130 and 165 degrees.

37. The computer mouse pad of claim 36, wherein said second angle and said third angle are both approximately equal to 135 degrees.

38. A computer mouse pad, comprising a solid form nestable within a frame, said solid form having a top surface, a bottom surface, a first side surface, a second side surface having a shape and size approximately equal to said first side surface, and a third side surface, wherein said top surface is connected to said bottom side surface, said first side surface, said second side surface, and said third side surface, said bottom side surface is also connected to said first side surface, said second side surface, and said third side surface, and said third side surface is also connected to said first side surface and said second side surface, further wherein said top surface and said bottom surface form a first angle, said top surface and said first side surface form a second angle, and said top surface and said second side surface form a third angle equal to said second angle, further wherein said frame includes a bottom section and a first section extending upward from said bottom section, and said third edge of said top surface is parallel to said first section.

39. The computer mouse pad of claim 38, wherein said third edge of said top surface is adjacent said first section.

40. The computer mouse pad of claim 38, wherein said frame includes a bottom section and adjustable supports connected to said bottom section for adjusting said first angle.

* * * * *